United States Patent [19]
Cole

[11] Patent Number: 5,531,865
[45] Date of Patent: Jul. 2, 1996

[54] ELECTROLYTIC WATER PURIFICATION PROCESS

[76] Inventor: Leland G. Cole, 1667 Lake Front Rd., Lake Oswego, Oreg. 97034

[21] Appl. No.: 395,917

[22] Filed: Feb. 28, 1995

Related U.S. Application Data

[63] Continuation-in-part of Ser. No. 279,629, Jul. 25, 1994, abandoned, which is a continuation of Ser. No. 932,316, Aug. 19, 1992, abandoned.

[51] Int. Cl.⁶ .............................. C02F 1/463; C02F 1/461
[52] U.S. Cl. .......................... 205/751; 205/761; 204/269; 204/275; 210/667
[58] Field of Search ..................................... 204/149, 152, 204/269, 275; 210/667; 205/751, 761

[56] References Cited

U.S. PATENT DOCUMENTS

| | | | |
|---|---|---|---|
| 3,926,754 | 12/1975 | Lee | 204/152 |
| 3,933,606 | 1/1976 | Harms | 204/152 |
| 3,959,129 | 5/1976 | White et al. | 210/28 |
| 4,152,229 | 5/1979 | Soltys et al. | 204/150 |
| 4,194,972 | 3/1980 | Weintraub et al. | 210/43 |
| 4,271,028 | 6/1981 | Marfurt et al. | 210/727 |
| 4,293,400 | 10/1981 | Liggett | 204/302 |
| 4,330,513 | 5/1982 | Hunter et al. | 423/245 |
| 4,623,436 | 11/1986 | Umehara | 204/149 |
| 4,857,198 | 8/1989 | Meidl | 210/603 |
| 4,960,520 | 10/1990 | Semmens | 210/640 |

FOREIGN PATENT DOCUMENTS

WO90/15025  12/1990  WIPO.

*Primary Examiner*—Arun S. Phasge
*Attorney, Agent, or Firm*—Flehr, Hohbach, Test, Albritton & Herbert

[57] ABSTRACT

A method for removing contaminants from a flow of wastewater using an electrolytic oxidation vessel having a chamber and at least one elongate cathode electrode and a plurality of elongate sacrificial anode electrodes aligned parallel with the cathode electrode in the chamber. The flow of wastewater is directed through the chamber of the electrolytic oxidation vessel in a direction parallel with the cathode and anode electrodes so that the flow of wastewater engages the cathode and anode electrodes. A voltage is applied across the cathode electrode and the sacrificial anode electrodes to create a current having a density ranging from approximately 5–7 ma/sq. cm so as to release ions from the anode electrodes which oxidize and render insoluble contaminants in the flow of wastewater and create insoluble contaminants and substantially cleansed water. The insoluble contaminants are separated from the substantially cleansed water. An apparatus for use with the method is provided.

31 Claims, 3 Drawing Sheets

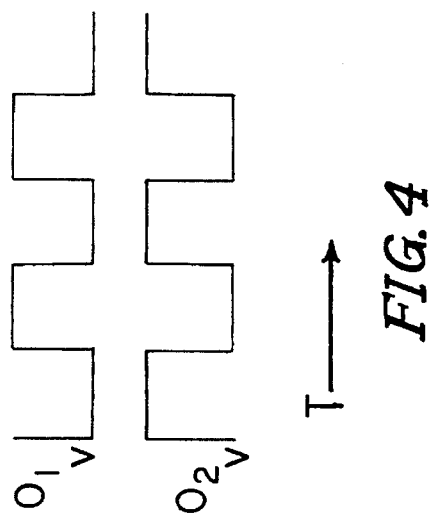
FIG. 3
FIG. 4
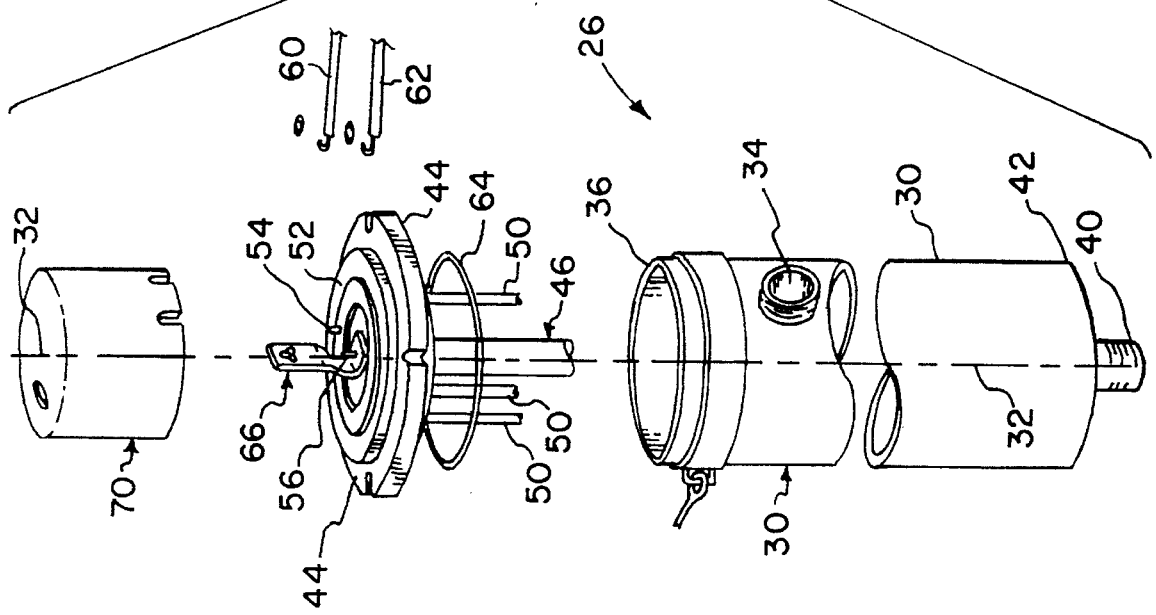
FIG. 2

ELECTROLYTIC WATER PURIFICATION PROCESS

BACKGROUND OF THE INVENTION

This application is a continuation-in-part application of U.S. patent application Ser. No. 08/279,629 filed Jul. 25, 1994, now abandoned, which is a continuation application of U.S. patent application Ser. No. 07/932,316 filed Aug. 19, 1992, abandoned.

The present invention relates to an electrolytic process for removing heavy metals and other impurities from waste water.

Waste water treatment is an area of ever-increasing importance as waterways and ground water become polluted by industrial processes. In the United States, water purity regulations are set at the Federal, State and local levels. These regulations typically specify acceptable levels for a wide range of contaminants in water discharged into public sewer systems, into waterways, or discharged in other manners. These regulations are becoming increasingly restrictive. Therefore, water purification measures that have been utilized in the past often are not suitable for meeting the more stringent water purity standards that presently exist or that are likely to be imposed in the future.

Many industrial processes produce water contaminated with hydrocarbons, such as oil and grease residues, suspended solids of a wide variety of origins, and toxic metals, such as cadmium, lead, mercury, arsenic, and the like.

Industrial laundries are one such source of contaminated water. Other industrial operations that create contaminated water include steel processing operations, mining, power stations, chemical factories, electroplating and metal finishing and refinishing operations, manufacturing process, and the like. Industrial laundries and many other polluting facilities are typically located in or near metropolitan areas, and often discharge the waste water into municipal sewer systems or may re-circulate and use the purified water.

It is important that the water so discharged meet the applicable standards of purity. For example, some municipalities require that the total oil and grease content of water discharged into municipal sewers be no greater than 100 parts per million (ppm), and some standards are as low as 20 ppm. Moreover, typical maximum levels for total suspended solids (TSS) are 250 ppm, and acceptable levels for heavy metals are often measured in parts per billion (ppb). One municipality sets the maximum acceptable level of cadmium at 100 ppb, and the maximum acceptable level for lead at 500 ppb.

In addition, many industrial processes are heavy users of municipal water. Much of this water is for rinsing operations, where relatively clean water is necessary, but where water need not meet culinary standards. In such operations, it would be advantageous to provide a means for re-using water in order to lower total water costs and conserve water resources.

Some experimental work has been done over the years on electrolytic precipitation of impurities from waste water. Typical of the prior art in this area is U.S. Pat. No. 3,933,606 to Harms. This patent discloses a device having perforated plate-shaped anodes and cathodes through which wastewater flows. The anodes are made of iron and are sacrificial. The electrolytic reaction generates oxidized iron compounds, which form hydrated hydroxides, which lead to formation of a floc. This floc facilitates the precipitation of impurities in the water. The process also oxidizes metallic impurities in the water, forming insoluble hydroxides which are precipitated with iron floc material.

While such processes of the prior art are successful in removing a certain level of impurities, many difficulties remain with such prior art processes. First such iron-anode electrolytic processes require large amounts of electricity to form an acceptable level of floc. This, in turn, leads to high electrical costs, and frequent down-time for replacement of the sacrificial anodes. Second, the floc that is formed is fine and is extremely difficult to remove from the waste water. Third, perforated electrodes of the type used by Harms tend to plug up when threads, strings, fibers, and other large particulate are present in the water being treated. Fourth, even when one is successful in separating the flocculated solids from the waste water, those solids themselves present disposal problems. Most landfills will not accept waste that includes leachable heavy metals. Fifth, prior art processes have not reduced waste materials to the levels required under today's more stringent regulations, and have not been effective in removing oil and grease to acceptable levels. The specifications for recirculation to some chemical process uses can be even more stringent. In this regard and as appreciated by those skilled in the art, the specifications of waters provided for reuse in industrial plants can be even more stringent than those for discharge to either publicly owned treatment works (POTW's) or to estuaries.

Accordingly, it is an object of the present invention to provide a process and apparatus for purifying waste water that addresses and solves many of the problems of prior art processes and apparatuses.

PRIOR ART DESCRIPTION

Apparatus and methods for removing impurities from wastewater are well known in the prior art. The prior art, however, does not disclose an electrolytic wastewater treatment process where the voltage and current densities applied to the anode are optimized and the ratio of sacrificial anode chemical types is optimally selected to effectuate the removal of hydrocarbons, natural oils, grease, heavy metals, oil/grease and suspended solids from wastewater.

U.S. Pat. No. 4,623,436 to Umehara describes an electrolytic wastewater treatment apparatus and method. The process uses electrolysis and flocculation to treat wastewater containing impurities such as the heavy metals and colloidal particles. The '436 patent does not disclose treating hydrocarbon containing wastewater. Therefore, there is no mention of optimizing anode voltage to treat hydrocarbons in wastewater.

U.S. Pat. No. 4,271,028 to Marfurt, et al. describes a process for purifying protein containing aqueous effluents. The process described merely treat the wastewater with a basic polymer. U.S. Pat. No. 4,271,028 makes no mention of electrolytic treatment of wastewater.

U.S. Pat. No. 3,959,129 to White, et al. discloses a process for purifying water containing water based printing inks and starch adhesives wastes. The patent discloses using a rotary vacuum filter to recover floc like solids from a water treatment process, but not in conjunction with a chemical fixing agent to decrease leachability of the resultant sludgecake.

U.S. Pat. No. 3,933,606 to Harms discloses a process for electrolytically removing suspended and dissolved impurities water contaminated with heavy metals. U.S. Pat. No. 3,933,606 does not indicate that the process is useful in treating water containing natural fats and hydrocarbons.

Additionally, U.S. Pat. No. 3,933,606 fails to disclose an optimum anode voltage.

U.S. Pat. No. 4,194,972 to Weintraub, et al. discloses a method for breaking an oil-in-water emulsion. The method consists of passing the fluid containing the oil/water emulsion across a porous electrode operating at a specific current to produce iron oxide that breaks the emulsion. U.S. Pat. 4,194,972, however, fails to disclose a voltage range that is useful for promoting the oxidation and flocculation of oil in wastewater where there is no emulsions, or in wastewater containing heavy metal impurities.

SUMMARY OF THE INVENTION

The process of the present invention can remove all types of regulated contaminants, such as suspended matter, including soil, colloidal particles, bacteria, and the like, all of the Environmental Protection Agency's priority heavy metals, including lead, tin, nickel, cobalt, cadmium, zinc, mercury, silver, platinum and antimony, as well as oils, grease, hydrocarbons, volatile organic compounds (VOC's), certain biological organics (BOD's), certain non-biological organics (COD's), cyanide complexes, and the like from wastewater. In addition, the particular operating conditions ensure the oxidative destruction of VOC, s, BOD's and COD's.

Thus, in accordance with one aspect of the present invention, there is provided a method for purifying contaminated water containing heavy metal impurities, oils and greases, comprising the steps of directing a flow of the contaminated water through a first electrolytic oxidation chamber, comprising a plurality of electrodes arranged parallel with the direction of the flow, wherein the electrodes include at least one cathode and at least one sacrificial floc-forming anode, and wherein the water passes over and around the electrodes, applying a voltage of from about 15 to about 20 volts to the electrodes to electrolytically generate oxidized metal ions from the anodes, and to oxidize heavy metal impurities to precipitable heavy metal oxy-hydroxides and to partially oxidize oils and greases, and other hydrocarbons in the water, increasing their absorbability by the flocculating agents, (also known as moieties) rendering the latter insoluble as well. The oxidized ions constitute flocculating moieties permitting a floc to form in water exiting the chamber, separating the floc from the water to generate purified water and sludge, and directing the sludge to a rotary vacuum filter to generate a sludge cake. The preferred sacrificial anode materials are iron, magnesium and aluminum, and a combination of iron together with magnesium and/or aluminum is particularly advantageous. The method may also comprise the step of combining the sludge cake with a cementaceous material to form a non-leachable solid. In one permutation of the method, the contaminated water further contains hydrocarbon materials, and wherein formation of the floc removes the hydrocarbon materials from the water. In another permutation, the voltage is a square wave. In one preferred embodiment, the method further comprises simultaneously directing a portion of the contaminated water into a second electrolytic oxidation chamber, wherein the square wave is created from a steady d.c. voltage by alternately directing the voltage to electrodes in the first and second chambers respectively.

The method may further include the step of adding a chemical flocculating agent to the water after the electrolytic oxidation to enhance formation of the sludge. Additional purification can occur by directing the purified water through a clarifier and/or rotary vacuum filter.

The method also optionally includes the step of facilitating the formation of the floc by providing ferrous sulfate, instantaneously prepared calcium hydroxide, and/or by adding a polymeric flocculent to the water.

In another embodiment of the invention, the contaminated water further contains cyanide compounds, and the method oxidizes the cyanide compounds and removes the cyanide oxidation products in the sludge. Often, the contaminated water contains at least 10 ppm lead and the water from which the sludge has been removed contains no more than 500 ppb lead. Similarly, the contaminated water often contains at least 10 ppm, cadmium and the treated water contains no more than 10 ppb cadmium. Further, the contaminated water often contains at least 1500 ppm oil and grease, and often up to 0.5 percent oil and grease and the purified water contains no more than 100 ppm oil and grease. Substantial reductions in total suspended solids are also achieved.

Some use of reclaimed water is also contemplated. Thus, where the contaminated water was generated in an industrial process, the method may further comprise the step of directing the purified water back into the industrial process. One such industrial process is a commercial laundry operation where the reclaimed water can be used for wash water make-up.

In another embodiment of the invention, a method for removing contaminants from a flow of wastewater using an electrolytic oxidation vessel is provided. The vessel has a chamber and at least one elongate cathode electrode and a plurality of elongate sacrificial anode electrodes aligned parallel with the cathode electrode in the chamber. The flow of wastewater is directed through the chamber of the electrolytic oxidation vessel in a direction parallel with the cathode and anode electrodes so that the flow of wastewater engages the cathode and anode electrodes. A voltage is applied across the cathode electrode and the sacrificial anode electrodes to create a current having a density ranging from approximately 5–7 ma/sq. cm so as to release ions from the anode electrodes which oxidize and render insoluble contaminants in the flow of wastewater and create insoluble contaminants and substantially cleansed water. The insoluble contaminants are separated from the substantially cleansed water. An apparatus for use with the method is provided.

BRIEF DESCRIPTION OF THE DRAWINGS

FIG. 2 is an exploded perspective view of the electrolytic reactor of the present invention.

FIG. 3 is a schematic diagram of the power supply for the electrolytic reactor.

FIG. 4 is a graph of the dual output of the power supply of FIG. 3.

Additionally, the filtration of the clarified water by the process of this invention is also contemplated. The clarified water can be accumulated and processed with the rotary vacuum filter that processes the sludge on a batch basis, or a dedicated vacuum filter may be used to process the clarified water.

In another embodiment, the process of this invention includes an oxidation reactor for oxidizing part or all of excessive amounts of the volatile organic compounds contained in the wastewater prior to directing the wastewater into the electrolytic reactors. The oxidation reaction can be accomplished, under some regulatory conditions, using a vapor phase oxidation reactor or using an irradiation source alone or in conjunction with an oxidizing agent such as hydrogen peroxide or ozone.

DETAILED DESCRIPTION OF THE INVENTION

Figure 1:
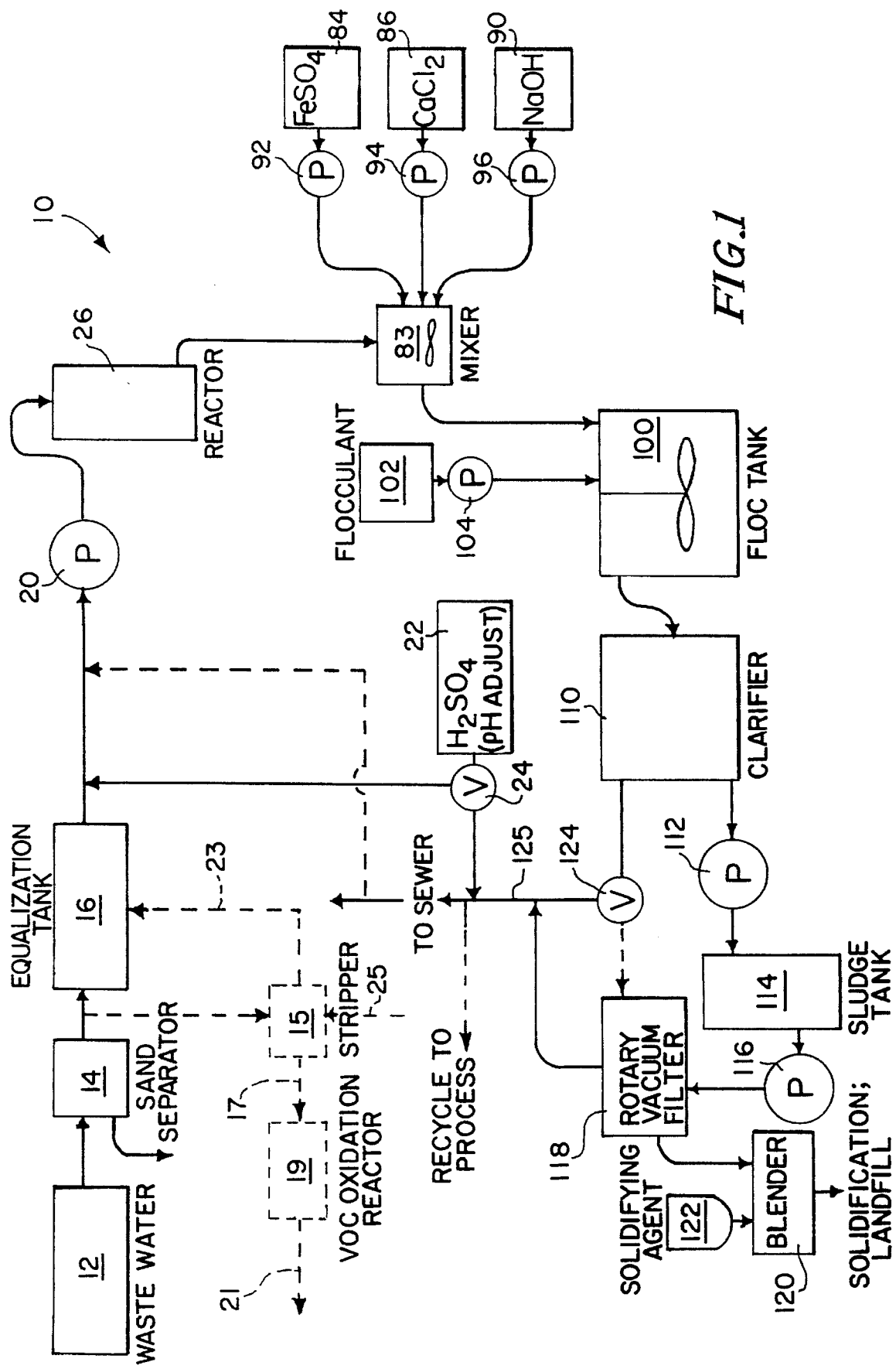
FIG. 1 is a flow diagram schematically setting forth the process and apparatus of the present invention.

With reference to FIG. 1, the purification apparatus 10 is connected to a waste water reservoir 12 or other source of water. The apparatus 10 may optionally include a sand or particulate separator 14 of conventional design for removing larger particulate from the waste water prior to treatment of the waste water. The sand separator removes much of the sand, lint, threads, plant material, and other macroscopic particulate materials, and directs the water into an optional equalization tank, 16, where the water is collected prior to being fed into the remainder of the apparatus 10.

It is preferred that the equalization tank 16 be of sufficient volume that process water may be collected in the tank for a period of time even when the purification apparatus 10 is not in operation.

In the purification process per se, waste water is moved out of the equalization tank 16 at a predetermined rate by means of a first pump 20. To the extent necessary, the pH is adjusted by adding either an acid or base into the water leaving the equalization tank 16. In one embodiment of the invention, an acid tank 22 is provided for providing an acid such as sulfuric acid ($H_2SO_4$) into the water leaving the equalization tank to maintain the pH of that water within a predetermined range. It is preferred, for example, that the pH of the water entering the process from the equalization tank 16 be between about 7 and 9.5, preferably between about 8 and 9. A pH greater than 7 is necessary to form hydroxides and oxyhydroxides of the heavy metals to effect their precipitation as a floc.

While the embodiment of the invention illustrated in FIG. 1 is particularly adapted for use in combination with the effluent from an industrial laundry, which has a high pH, it should be understood that a similar apparatus can be used for treatment of waste water having a low pH or a widely varying pH. Where water having a low pH is introduced into the process, the acid tank 22 may be replaced by a base tank (not shown). Alternatively, both an acid tank and a base tank may be provided. A first valve or metering pump 24 may advantageously be provided to introduce the proper amount of acid (or other pH adjusting material) from the acid thank 22 into the water leaving the equalization tank 16. The first valve 24 is preferably under feedback control to maintain the water entering or leaving the first pump 20 within a predetermined pH range. Thus, the first valve 24 may be a metering valve or a valve in combination with a metering pump.

In an alternative embodiment, the pH adjusting acid or other material may be introduced into the process downstream of the first pump 20, and may be mixed with the water entering the process by means of a conventional mixer (not shown).

The pH-adjusted water leaving the first pump 20 enters one or more electrolytic reactors 26. One preferred embodiment of the electrolytic reactor 26 is illustrated in more detail in FIG. 2. In this exploded view, the reactor 26 is illustrated as having an elongated reactor body 30. This reactor body 30 is preferable of cylindrical design, although rectangular and other configurations are also contemplated. Although the reactor body 30 is foreshortened in FIG. 2, it will be understood that the length of the reactor body 30 (taken along the axis line 32) is substantially greater than the width or diameter of the reactor body 30 (taken in a direction orthogonal to the axis line 32). Indeed, the length of the reactor body 30 is preferably at least two times the width, preferably at least three times the width, and more preferably at least four times the width of the reactor body 30. In one particularly preferred embodiment, the length of the reactor body 30 is approximately six times the width thereof. Thus, the reactor body 30 may have a width of about 10 inches and a length of about 60 inches. Of course, the exact dimensions may be varied depending upon the installation, on the amount of water to be treated, and on the number of reactors in use in the process.

The reactor 26 may advantageously be provided with an inlet 34, preferably located near the top 36 of the reactor 26, and advantageously located in the reactor body 30 itself. The process water preferably flows downward through the reactor body 30 and out of the outlet 40, which is preferably located in the vicinity of the bottom 42 of the reactor 26. In one preferred embodiment, the bottom 42 of the reactor 26 tapers down to the diameter of the outlet 42.

At the top 36 thereof, the reactor 26 is provided with an insulating electrode plate 44 which closes the top of the reactor body 30. The electrode plate 44 supports a plurality of electrodes, which comprise at least one cathode 46 and at least two anodes 50. The cathode 46 and the anodes 50 extend downwardly from the electrode plate 44 into the interior of the reactor body 30. These electrodes are aligned with the axis line 32 of the reactor 26, and are spaced apart from each other.

In one particularly preferred embodiment, there is one cathode 46, preferably located in the center of the reactor body 30 along the axis line 32. This cathode 46 is surrounded by a plurality of anodes 50, which extend downwardly through the reactor body 30 parallel to the cathode 46. At least some of the anodes 50 are made out of the iron, and it is preferred that one or more of the anodes 50 are made of magnesium and/or aluminum. In one particular embodiment of the invention, a central cathode 46 is surrounded by at least 4 anodes, preferable at least 6 anodes and more preferably at least 8 anodes, all radially spaced from the cathode 46 and circumferentially spaced from the other anodes 50.

The parallel electrode design of the present invention provides significant advantages in flow through of waste water containing macroscopic materials, such as lint, threads, plant materials, and the like. We have found that this design not only provides excellent results from the standpoint of water purification, but also is highly resistant to plugging.

The electrode plate 44 includes means for mounting the electrodes. In the illustrated embodiment, an annular anode bus plate 52 is provided on the electrode plate 44, radially spaced from the axis line 32 of the reactor 26. The anode bus plate 52 is in electrical contact with the anodes 50, which are preferably threaded into the anode bus plate 52 or otherwise removably connected thereto. A first connector 54 is provided on the anode bus plate 52 for allowing connection of the anode bus plate 52 to a source of electricity. The provision of removable anodes 50 facilitates maintenance of the reactor 26 for the inevitable replacement of the sacrificial anodes 50.

In a similar manner, a means is provided for connecting the cathode 46 to a source of electricity. This may advantageously be a second electrical connector 56 on the top of the electrode plate 44 to which a source of electrical current can be connected. In the illustrated embodiment, the first and second electrical connectors 54, 56 may advantageously be adapted for connection to first and second wires 60 and 62, respectively. These wires 60, 62 carry power to the electrodes.

In the embodiment where a single central cathode 46 is surrounded by one or more iron anodes 50 together with one or more magnesium and/or aluminum anodes 50 in a reactor body 30 having a diameter of about 10 inches, one preferred design has a cathode of approximately 2 inches in diameter, surrounded by about 9 anodes, each having a diameter of about one half inch and spaced radially outward from the axis line 32 of the reactor 26 about 4 inches.

The electrode plate 44 fits down over the top of the reactor body 30 in a water tight manner. The seal between the electrode plate 44 and the reactor body 30 may be facilitated by an appropriate means, such as by an "O" ring 64. Moreover, in order to facilitate lifting of the relatively heavy electrode plate 44 off of the reactor body 30, a lifting bracket 66 may be provided on top of the electrode plate 44 in solid connection therewith.

A cover cap 70 may be provided on top of the electrode plate 44 in order to protect the anode bus plate 52, the electrical connectors 54, 56, and the uninsulated ends of the wires 60, 62. The cover cap 70, in one embodiment, is made from PVC material, as is the reactor body 30. The cathode 46 may be made of any relatively non-reactive electrically conductive material, such as stainless steel tubing, nickel plated material, or other suitable material compatible with the process water.

In use, water containing contaminants such as heavy metals, oils, grease, hydrocarbons, volatile organic compounds, metals and cyanide complexes is introduced into the inlet 34 of the reactor 26 and flows through the reactor 26 and out of the outlet 40. At the same time, a voltage is applied between the electrodes 46, 50 in the reactor 26. While a wide range of voltages may be used, a voltage in the range of from about 15 volts to about 20 volts is has been found to be necessary to effect the flocculation of all wastewater contaminants. Operating the voltage in this range produces mean electrode current densities of from 5–7 ma/sq. cm and localized, point current densities as high as from 10–100 ma/sq. cm sufficient to partially oxidizes the oils, greases, hydrocarbons, volatile organic compounds and other organics (such as octyl phthalates) in the wastewater by opening double bonds thereby changing the polarity of the contaminants making them more compatible with the polar chemical flocculating agents. The electrical operating conditions at the anodes effect the oxidation of volatile organic compounds quantitatively as well as other organics to a significant degree. For example, the troublesome octyl phthalates are completely destroyed at the anodes, a major advantage over other systems. Operating the voltage at a range from 15 to 20 volts also promotes the oxidation of the electrodes to form metal oxy-hydroxides. The enhancement of metal oxy-hydroxide formation is a result of the effect of the high voltage operation on the surface of the electrodes. The power supply preferably is capable of providing at least 10 amps, more preferably 15 amps or more to the electrodes.

We have used a power supply capable of delivering 50 amps, with good results.

In one preferred embodiment of the invention, the apparatus 10 includes a plurality of reactors 26 arranged in parallel. In this embodiment, a single power supply may be used to power two separate reactors. One suitable power supply configuration is illustrated in FIG. 3. In that figure, a current limited, adjustable voltage DC power supply 72 provides a constant output which is directed to a switch 74 of any suitable design. The switch 74 alternately directs the output from the DC power supply 72 to load 1, indicated by the reference number 26A in FIG. 3. The switch 74 may be a mechanical switch; however, a solid state switch such as a MOS or CMOS switch is preferred. The switch 74 may be controlled by a signal source 82, which can be a source of alternating current. In one preferred embodiment, the signal source 82 is simply the 50 or 60 hertz line voltage from the electrical utility. Alternatively, conventional timers or triggers may be used as a signal source 82 to control the switch 74.

The outputs of the switch 74 into load 1 and load 2 are graphically represented in the two graphs of FIG. 4, in which $O_1$ is the output to load 1 and $O_2$ the output to load 2 as a function of time. As can be seen, each output $O_1$ and $O_2$ receives a square wave output having a 50% duty cycle. Of course, load 1 is one reactor 26 and load 2 is another reactor 27. This power supply configuration permits use of a single power supply 72 to drive two reactors 26 while maintaining a substantially constant load on the power supply 72, conserving power.

The switching frequency of switch 74 is preferably between 1 hertz and 600 hertz, more preferably between about 10 hertz and about 120 hertz. The use of a square wave output of this type with the corresponding pulsed direct current is believed to increase the electrolytic efficiency of the reactor 26 and avoid the build up of charge and deposits in the vicinity of the electrodes 46, 50.

If desired, a means for providing a constant current output to the electrodes 46, 50 may be provided to compensate for varying conductivity of the water being treated. Suitable constant-current power supplies are known in the art and are discussed, for example, in U.S. Pat. No. 3,993,606.

With reference again to FIG. 1, the contaminated water may be pretreated or diluted prior to entering reactors 26 in order to reduce volatile organic compound or VOC concentration of the contaminated water thereby reducing the electricity demand of the electrolytic reactors.

In one method, the filtered contaminated wastewater is directed in part or entirely to gas stripper 15. Air or some other gas is directed via stripping gas stream 25 into gas stripper 15 in order to volatilize part or all of the volatile organic compounds dissolved in the contaminated wastewater. The VOC containing gas stream 17 is then directed to an oxidation reactor 19 operating at oxidation reaction conditions to oxidize the volatile organic compounds to produce oxidation product stream 21 comprising water and carbon dioxide.

In one oxidation method, the catalytic oxidation is performed in a reactor at gas phase conditions using a solid catalyst. The oxidation reaction conditions include a reaction temperature in the range of from about 150° C. (300° F.) to about 800° C. (1470° F.). Most preferably the reaction temperature should be maintained in the range from about 200° C (700° F.) to about 550° C. (1250° F.). The gas space velocity of the VOC containing vapor phase stream in the reaction zone is from about 0.1 sec$^{-1}$, to about 1000 sec$^{-1}$, most preferably from about 5 sec$^{-1}$ to about 100 sec$^{-1}$. The reaction zone pressure preferably is in the operating range of from atmospheric to about 405 kPa (abs (44 psig), with a most preferred operating pressure of from about atmospheric to about 150 Kpa (abs) 9 psig). The chemically oxidizable compounds in the vapor stream are catalytically oxidized in the presence of the steam generated by heating the water and VOC containing gas stream 17.

The solid catalyst used in the oxidation zone may be selected from any of the known commercially existing oxidation catalyst compositions, or mixtures of known oxidation catalysts, that meet the required standards for stability and that possess a high selectivity for oxidation of volatile organic and inorganic compounds. The active component of the oxidation catalysts is metal, preferably a nonprecious metal, supported on a solid carrier. The preferred solid carrier is alumina, however, any known carriers may be used, for example, silica, silica-alumina, clay or like materials. The carrier may be in the form of spheres, pellets, or extradites. The amount of active metal on the catalyst is preferably from about 5 to about 50 weight percent, based on the total catalyst weight. More preferably the metal component comprises from about 15 to about 25 weight percent of the catalyst. A preferred oxidation catalyst composition includes chromic oxide and alumina in the form of an extradite. This preferred catalyst and its method of preparation are more thoroughly described in the U.S. Pat. No. 4,330,513 (Hunter et al.), which is incorporated herein by reference.

The use of gas stripper 15 is not needed when reactor 26 is operated at optimal voltage and current density levels so as to ensure oxidation at the surface of the iron-magnesium, iron-aluminum or iron-aluminum-magnesium anode electrode combinations. It should be appreciated, therefore, that a process and apparatus without gas stripper 15 would be within the scope of the present invention.

In an alternative oxidation method, the volatile organic compounds in clear contaminated water are partially or totally oxidized using a photolyric oxidation alone or in conjunction with an oxidizing agent such as hydrogen peroxide or ozone. One useful photolyric oxidation process is the (Radinox) process manufactured by Electox Environmental, Inc. of San Mateo, Calif. The (Radinox) process is described in U.S. Pat. No. 4,849,115 which is incorporated herein by reference.

The gas stripped contaminated wastewater stream 23 produced by gas stripper 15 is directed to equalization tank 16. Alternatively, clarified water product 125 can be mixed with the contaminated wastewater to dilute the amount of volatile organic compounds in the contaminated wastewater stream entering reactor 26. Diluting the VOC contaminated wastewater improves the VOC oxidation efficiency of reactors 26.

The contaminated water from the first pump 20 enters one or more reactors 26. In these reactors 26, electrolytic reactions occur that facilitate the removal of a multitude of impurities from the water. A large number of metals are converted to insoluble hydroxide forms. A hydrated ferrous hydroxide or ferric hydroxide is created from the sacrificial iron anodes, forming a floc. At the same time, a very effective floc is formed electrolytically from the magnesium or aluminum anodes. The use of such magnesium and/or aluminum anodes for formation of a floc substantially improves the performance of the electrolytic reactor and facilitates much more complete removal of a wide range of impurities from the waste water, including the oxidation of volatile organic compounds and organics in the wastewater.

Waste water leaving the reactors 26 may optionally proceed into a high speed mixer 83 where it is intimately combined with additional materials that facilitate floc formation. These materials may include ferrous sulfate, a supplemental floc forming material that is useful for heavy metals and organic, and particularly useful for oil and grease flocculation, as well as a combination of calcium chloride and sodium hydroxide, which together instantaneously form calcium hydroxide, another effective floc former. The ferrous sulfate may be provided from a ferrous sulfate reservoir 84, the calcium may be provided from a calcium chloride reservoir 86, and the sodium hydroxide may be provided from a sodium hydroxide reservoir 90. These reservoirs 84, 86, 90 are provided, respectively, with second, third, and fourth metering pumps, 92, 94, 96, respectively. These metering pumps, 92, 94, 96 meter their respective reagents into the mixer 83 at a predetermined rate. For example, we have found that ferrous sulfate, as $FeSO_4 7H_2O$ dissolved in water, may advantageously be provided at the rate of about 500–2000 mg/liter (of the hydrate), and the calcium chloride and sodium hydroxide may advantageously be provided at the rate of 200–500 mg/liter in treating waste water from an industrial laundry. Of course, waste water from other sources may require different levels of these reagents. Appropriate levels for these reagents may readily be determined by empirical measures.

In one preferred embodiment for the purification of dye waters, iron and magnesium electrodes were employed in the optimum ratio of six iron to three magnesium and only calcium chloride, sodium hydroxide and an organic flocculent were employed to produce colorless, clear water from the dye house waste waters. The dye house waste waters, thus processed, were of such purity that they could be discharged to the POTW or, better, recirculated to process additional batches of fabric as many as five times.

The output of the mixer 83 is directed into a floc tank 100. The floc tank 100 is slowly stirred while the floc particles are permitted to grow. Typically, the residence time of the waste water in the floc tank 100 should be from about 2 to about 20 minutes.

In one preferred embodiment, formation of the floc is further facilitated by the addition of a chemical flocculent of known type from a flocculent reservoir 102 through a fifth metering pump 104 and into the water that has left the reactor 26, preferably into the floc tank 100. Any of a number of conventional flocculating agents may be used, including polymeric flocculent materials. These flocculating materials may be anionic, cationic, or nonionic, and can be selected based on the particular impurities being removed from the waste water. We have used a non-ionic polymeric flocculating agent sold under the trademark PERCOL by Allied Colloids, Suffolk, Va. with good results at the rate of about 2–10 mg/liter in treating the effluent of an industrial laundry.

After a predetermined residence time, sufficient to permit adequate formation of the floc, the floc-containing waste water is directed into clarifier 110 to separate the solids from the liquid. Clarifier 110 can be of any conventional design, such as an inclined plate clarifier, an inverted "v" element clarifier, or a conventional clarifier of other design. Suitable inverted "v" clarifiers are manufactured by Eimco Corporation, Salt Lake City, Utah under the trademark DELTA-STAK. Suitable inclined plate clarifiers are manufactured by Great Leaks Environmental Inc., Addison, Ill., and include model designation ICP-4-880. Clarifier 110 will typically remove from 90 to 96% of the water from the solids. As solids build up in clarifier 110, they are removed by a sixth pump 112 and directed to a sludge tank 114. Periodically, the sludge in the sludge tank 114 is pumped by means by a seventh pump 116 into a rotary vacuum filter 188 of conventional design. We have found that due to the nature of sludge formed by the process of the present invention, the combination of a rotary vacuum filter 118 with the remainder of the purification apparatus 10 provides vastly superior results. The rotary vacuum filter 118 is very resistant to plugging, and rapidly removes water from the sludge to provide a relatively dry filter cake.

A typical rotary vacuum filter 118 according to the present invention has a cylindrical drum (which can be made of perforated steel covered with a polypropylene fabric) partially submerged in a filter submergence tank. The drum is coated with a filter aid, which may be diatomaceous earth or other suitable material, such as the filter aids sold under the trademarks HARBORLITE by Harborlite Corp., Escondido, Calif., and CELITE by Mannsville Sales Corp., Lompoc, Calif. The filter as is typically coated onto the drum to a predetermined thickness, such as three inches. The drum rotates slowly through the submergence tank, as a vacuum is applied to the interior of the drum, drawing liquid into the drum and depositing solids on top of the filter aid. The solids that collect on the filter aid are then shaved off of the drum by a doctor blade, which slowly advances toward the drum (e.g., at a rate of about 0.004 to 0.040 inches/minute).

The filter cake removed from the drum of the rotary vacuum filter 118 contains approximately 50% moisture. This filter cake is directed into a blender 120 (such as a plow blender), where it is combined with a solidifying agent from a hopper 122. The solidifying agent is a cementaceous material that solidifies the filter cake.

Suitable cementaceous solidifying agents are commercially available. One suitable cementaceous material is an organophilic silicate cement available commercially from Silicate Technology Corporation, Scottsdale, Ariz., under the trademarks SOILSORB HM. SOILSORB HM is preferred, but good results are also obtained with SOILSORB HC. These organophilic cements are particularly advantageous when substantial quantities of organic material are present in the filter cake, and they provide a nonleachable solid that can readily be disposed of in landfills.

In an alternative embodiment of the present invention, the filter cake may be solidified by combining it with other cementaceous materials, such as portland cement, or plastic cement. When the cementaceous material is not lipophilic, organic materials are preferably removed from the filter cake by roasting (e.g., heating to a temperature of 500° F. to 900° F.) in a suitable incinerator, such as a rotary kiln, prior to the solidifying process.

The water leaving the clarifier 110 and the rotary vacuum filter 118 contains very low levels of metals, oil, grease, and total suspended solids. This purified water can either be directed to a municipal sewer, or in accordance with one aspect of the invention, it can be recycled to the process in which the water is generated. Thus, in a commercial laundry operation, the recycled water can be used, e.g., as makeup water for washing steps.

To the extent necessary, the pH of the purified water can be adjusted by sulfuric acid or other pH adjusting material directed through the first valve 24 into the purified water.

In still another embodiment of the present invention, the water leaving the clarifier 110 is directed through a second valve 124 and into the rotary vacuum filter 118 for further purification. By means of this optional step, we have been able to lower the levels of oil and grease in the clarified water (determined by infrared spectroscopy) from approximately 250 ppm down to <20 ppm, cadmium from about 70 ppb down to about 4 ppb, and lead from about 400 ppb down to about 2 ppb.

As can readily be seen, reduction of impurities by an additional order of magnitude is accomplished by this step of routing the clarifier effluent water through the rotary vacuum filter when the rotary vacuum filter is not being used to process sludge. The clarifier effluent can be purified in this manner while the purification apparatus 10 is on line, and the sludge tank 114 can be emptied while the purification apparatus 10 is off line by running the sludge through the rotary vacuum filter 118 during that time. Alternatively, the apparatus 10 can be provided with two rotary vacuum filters, one for the clarified effluent water, and the other for sludge. This would provide continuous on-line operation of the purification apparatus 10.

Solids removed by the sand separator 14 can be combined with solidifying agent in the blender 120 for landfill disposal.

The optimization of the operation of the process of the present invention can be further understood by reference to the following example.

EXAMPLE I

One of the features of the invention is the discovery that the heavy metals are rather completely bound-up in the sacrificial anode oxy-hydroxide floc which is produced electrolytically in the flocculating reactors. The oxy-hydroxide of the heavy metal ions is very strongly absorbed to the oxy-hydroxy floc formed from the binary—iron and magnesium sacrificial anodes. Hence, the very low solubilities of the heavy metal ions after exiting the system. Metal ion concentrations below 10 ppb have been observed in the effluent waters produced by the process of this invention. More importantly, it was discovered that one ratio of six iron and three magnesium anode types in a typical reactor could produce lower concentrations of contaminants per unit resident time thus reducing reactor size, foot print and cost.

An additional feature of the invention was the discovery that oils and greases (miscellaneous hydrocarbon mixtures, even containing some vegetable fats and oils) were partially oxidized and, as more polar species, were more readily occluded by the combination of highly polar inorganic and organic flocculating agents. It was also observed, and, therefore, a significant part of this invention, that a minimum flocculating reactor voltage need be impressed on the reactor voltages to ensure this partial oxidation of the otherwise polar oils and greases.

The minimum voltage was determined to be in the range of 15–20 volts, imposed between the stainless steel cathode and the paired iron and magnesium anodes. This voltage range, for the reactor configuration employed, translates into a current density of approximately 5 to 7 ma/.sq. cm. At these preferred current densities, and at the pH range of 8–9 superoxide, hydroxide radical and nascent oxygen are all produced in significant quantities so as to effect the partial oxidation of the hydrocarbons (oil and greases, volatile organic compounds, etc.) to some extent. Measurable reductions of volatile organic compounds have, in fact, been made. Furthermore, free oil pooling in the floc development tank downstream of the electrolytic reactors has been observed and has been reversed and "pooling" eliminated by raising the current density to produce more of the oxidizing species cited above.

EXAMPLE II

A waste water purification apparatus 10 was provided having a design capacity of 75 gallons per minute and operated at 50 gallons per minute. The pump 20 is directed water from an industrial laundry at pH 10.5–12.5, adjusted to pH 8–9, through six reactors 26. Each of the reactors 26 has a reactor body 30 formed of 10 inch diameter PVC with a volume of approximately 15.5 gallons each. The residence time of the water in each reactor operating at design capacity is 1.5 minutes, but in this example the residence time in each reactor was approximately 1.9 minutes. Each reactor had one central cathode and nine anodes, five of which were iron and four of which magnesium, arranged radially around the central cathode in a circle of 4 inch radius. The anodes, which were alternately arranged around the cathode, were approximately ½ inch in diameter and 48 inches long. The cathode was approximately 2 inches in diameter, was formed of No. 360 stainless steel tube and was approximately 48 inches long.

Square wave power was delivered to the reactors at 60 hertz and 15 volts from a 50 amp power supply. The current supplied to each reactor 26 was adjusted to approximately 20 amps.

The electrolytically treated water leaving the six reactors 26 entered the mixer 83, where it was combined with $FeSO_4 7H_2O$ (1000 mg/liter), calcium chloride (about 300 mg/liter) and sodium hydroxide (about 300 mg/liter). The mixer 83 had a working capacity of about 26 gallons, and the residence time of the water in the mixer 83 was about ½ minute. The mixer 83 was connected to the floc tank 100, which has a volume of approximately 426 gallons. The residence time of the liquid in the floc tank was about 8.5 minutes.

Water leaving the floc tank 100 was directed into a specially modified EIMCO/DELTA-STACK clarifier which had a retention time of about 30 minutes. Sludge from the clarifier was directed through a rotary vacuum filter. Purified water leaves the clarifier exit to be recycled to the unit of to be withdrawn as a clean treated water product.

The values of several contaminants in the water entering the process were compared with the values of the water leaving the rotary vacuum filter, with the following results:

| CONTAMINANT | BEFORE | AFTER |
| --- | --- | --- |
| Oil and Grease | 2750 ppm | 18 ppm |
| Suspended Solids | 3100 ppm | 23 ppm |
| Cadmium | 2000 ppb | 4 ppb |
| Lead | 11000 ppb | 2 ppb |

The levels all of these contaminants in the purified water are well below typical Federal, State, and local water purity standards.

Figure 5:
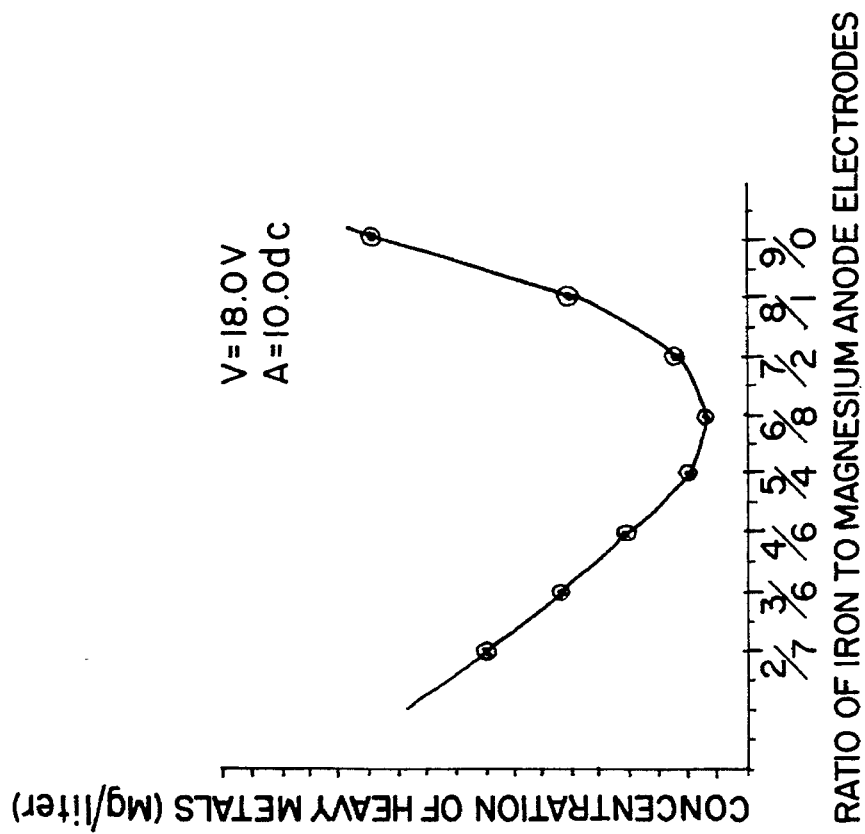
FIG. 5 is a graph of the concentration of heavy metals versus the ratio of iron to magnesium anode electrodes for the electrolytic reactor operated under the method of the present invention.

In further developments of the present invention, it has been found that an effective reduction of volatile organic compounds and other contaminants, particularly heavy metals, can be achieved by optimizing the ratio of anode types used in parallel with a stainless steel cathode. Although the results of FIG. 5 relate to the heavy metal cupric copper, similar results have been obtained for lead and chromium. As a result, it is expected that the results of FIG. 5 are equally applicable to other heavy metals. In this regard, the removal of heavy metals such as lead, cadmium, chromium and zinc contaminating an industrial process stream would be similarly effected by the ratio of iron and magnesium anodes provided in the reactor. The empirical data in FIG. 5 relates to an electrolytic reactor of the type described operating with nine sacrificial anodes and one cathode. The ratio of iron to magnesium anodes is changed progressively from two iron anodes and seven magnesium anodes to nine iron anodes and zero magnesium anodes. The data was obtained at a constant reactor voltage of 18 volts and with a total reactor current between the cathode electrode and the plurality of anode electrodes of 10 amps of pulsed direct current.

FIG. 5 illustrates that minimum concentrations of approximately 7 ppb for the heavy metal of cupric copper are obtained when the ratio of sacrificial iron anodes to sacrificial magnesium anodes is 6:3. Reduction in heavy metal concentrations of this magnitude are important now that the requirements for low heavy metal concentrations are being enforced by the Environmental Protection Agency and similar bodies for purification systems wishing to discharge their treated waters into estuaries and other waters where these requirements are most rigid and limiting. The optimal rationing of the types of anode electrodes have been found to be more effective than diluting VOC contaminated wastewater in the manner discussed above.

Data similar to that shown in FIG. 5 has been obtained for electrolytic reactors containing sacrificial anodes of iron and aluminum electrodes. Maximum heavy metal removal occurred at a ratio of five iron anodes and four aluminum anodes. The heavy metals of copper and zinc were reduced to below 15 ppb and oil and greases to below 12 ppm. Current densities were approximately 7 ma/sq. cm. For industrial liquid streams containing levels of fats, oils and greases (FOG's) greater than 2,000 parts per million, the optimum iron to aluminum ratio has been found to be 3:6, while the optimum sacrificial iron anode to sacrificial magnesium ratio for such streams has been found to be 5:4. FOG's were reduced to below 15 ppm for the cited iron and aluminum anode combination, while the iron and magnesium anode electrode pair of 5:4 reduced FOG's to less than 25 ppm at current densities of 7–10 ma/sq. cm.

It has been found that optimal contaminant removal has been obtained with the electrolytic oxidation reactors of the present invention when operated at current densities of at least approximately 5 ma/sq. cm., preferably at current densities ranging from 5–50 ma/sq. cm. and more preferably at current densities ranging from 5–10 ma/sq. cm. It is desirable to maintain the operational current densities at as low a level as possible to minimize electrical power requirements.

Figure 6:
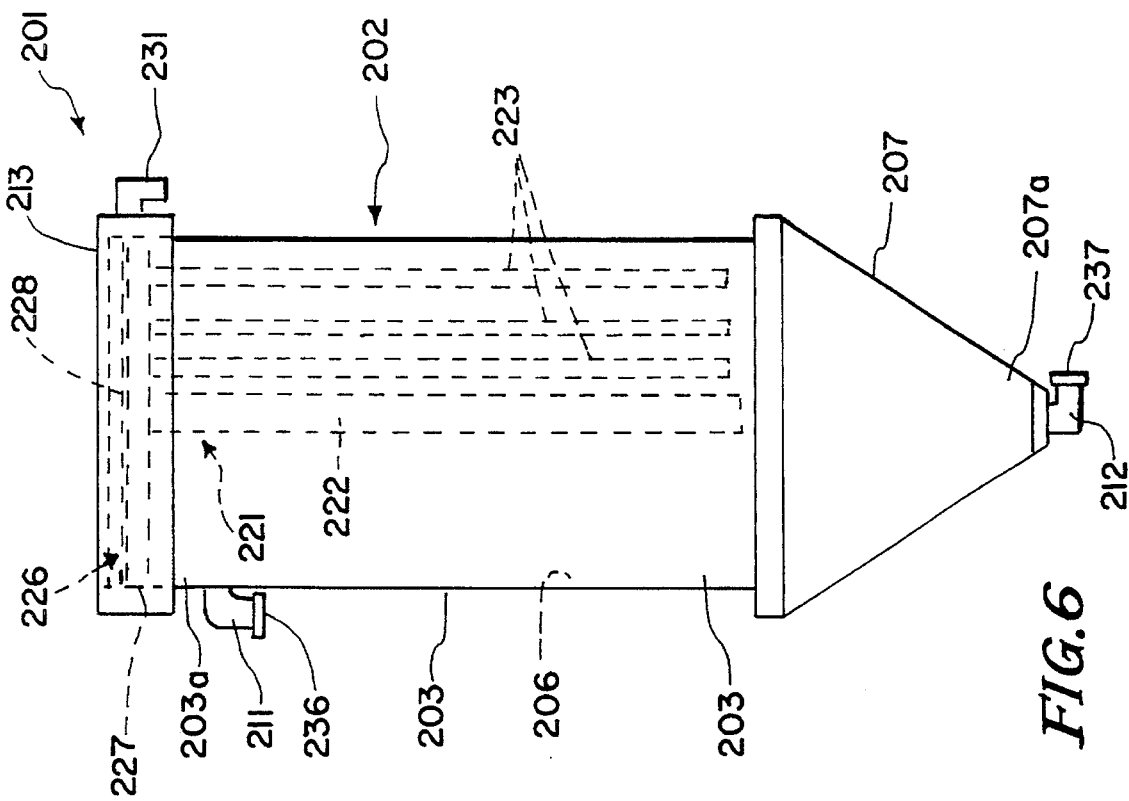
FIG. 6 is a schmetic diagram of another embodiment of the electrolytic reactor of the present invention.

It should be appreciated that the electrolytic oxidation vessel or reactor for use in the process of the present invention can have other embodiments and be within the scope of the present invention. For example, an electrolytic oxidation apparatus or reactor 201 similar to electrolytic reactor 26 described above is illustrated in FIG. 6. Reactor 201 includes an elongate cylindrical vessel 202 having a tubular side wall 203 made from any suitable electrically insulating material such as polyvinyl chloride. Axially-extending side wall 203 has a first or upper extremity 203a and an opposite second or lower extremity 203b and serves to form an internal chamber 206 of vessel 202. The vessel 202 further includes a hollow conical bottom wall portion 207 sealably joined to lower extremity 203b of the side wall and tapering radially inwardly at an angle of approximately 22° to a lower apex 207a. Influent and outfluent means in communication with internal chamber 206 are included within vessel 202 and include an influent inlet or inlet 211 connected to upper extremity 203a of side wall 203 and an effluent outlet or outlet 212 connected to the lower apex 207a of conical bottom wall portion 207. Tubular inlet and outlet couplings 211 and 212 have an internal diameter of approximately 2.5 inch and are preferably threaded so as to be of a quick-connect type. Vessel 202 is provided with a cap 213 sealably joined to upper extremity 203a of side wall portion 203. Conical bottom wall portion 207 and cap 213 are each formed from any suitable material such as polyvinyl chloride. As so constructed, side wall portion 203 has an internal length ranging from 40 to 66 inches and an internal transverse dimension or diameter ranging from 8 to 16 inches.

An electrode assembly 221 substantially similar to that included within oxidation reactor 26 is carried by vessel 202 and, more specifically, includes at least one elongate cathode electrode 222 made from any suitable inert material such as stainless steel and extending axially down the center of internal chamber 206. The centrally-disposed cylindrical cathode electrode 222 can have a length ranging from 36 to 60 inches and an external diameter ranging from 9 to 18 inches. Electrode assembly 221 further includes a plurality of elongate sacrificial anode electrodes 223 within chamber 206 aligned parallel with cathode electrode 222 and circumferentially disposed about the cathode electrode at approximately equal angular intervals. For simplicity, only some of the anode electrodes are shown in the schematic illustration of FIG. 6. Each anode electrode 223 is similarly sized and can have a length ranging from 36 to 60 inches and an outer diameter ranging from 0.5 to 2.0 inch. The dimensions of the electrodes are dependent in part upon the flow rate through reactor 201. For example, anode electrodes 223 may measure approximately 30 inches in length for lower flow rates and approximately 50 inches in length for higher flow rates such as 12.5 gpm.

As discussed above, the composition of anode electrodes 223 can vary. Favorable results have been found with a combination of iron and magnesium or iron and aluminum electrodes. A combination of iron, magnesium and aluminum electrodes is also possible. The ratio of iron to magnesium and/or aluminum anode electrodes has been found to be important in maximized contaminant removal as discussed above.

Means is provided for securing and carrying electrode assembly 221 and includes cap 213. More particularly, a flange assembly 226 similar to that provided for reactor 26 is included within reactor 201. Flange assembly includes an electrode plate 227 made from any suitable insulating material. An anode bus plate 228 is secured to the electrode plate and is electrically connected to each of the anode electrodes 223. Connector means including electrical connector 231 is included within reactor 201 and is electrically connected to cathode electrode 222 by a first means or wire (not shown) and to anode bus plate 228 by a second means or wire (not shown). Electrical connector 231 permits the application of a voltage across and between the cathode electrode and the plurality of sacrificial anode electrodes as discussed above with respect to reactor 26.

First and second hermetically sealing means which can include first or inlet cap 236 and second or outlet cap 237 are respectively mounted to inlet 211 and outlet 212. Caps 236 and 237 are removably mounted to the respective inlet and outlet.

The hermetically sealed reactor 201 facilitates the replacement of the sacrificial anode electrodes 223. As can be appreciated, the useful operational period of the anode electrodes depends on the electrical parameters under which the electrolytic cells of reactor 201 are operated, on the spacing between the central cathode electrode and the surrounding anode electrodes, on the diameter of the anode electrodes and the mean conductivity of the contaminated water stream to be treated.

The currently provided electrode replacement process involves the physical disassembly of the electrolytic reactor on a periodic basis, which can be as often as once every six to eight weeks of operation. The "corroded" anode electrodes are replaced one by one and any residual anode sections or their conductive core materials are removed from the bottom of the internal chamber of the reactor to ensure unimpeded flow of the treated water downstream of the reactor.

It has also been learned that the electrodes prepared for use in the reactor slowly but significantly corrode on exposure to moist air after machining and cleaning at the factory. This pre-installation corrosion can significantly affect the initial solution rate of the sacrificial anode electrodes when emplaced in the reactor and when electrical energy is first applied to the electrodes.

Reactor 201 permits the electrode assembly 221 to be encapsulated and hermetically sealed in an inert gaseous atmosphere such as dry nitrogen at the factory and kept sealed until just moments before installation. In this regard, the freshly prepared electrode assembly 221 will be desiccated, flushed and sealed with the inert, dry gas before storage and shipping to the customer. The controlled atmosphere around the electrode assembly during storage and shipping serves to minimize corrosion to the electrode assembly prior to installation and use.

Immediately prior to installation, caps 236 and 237 are removed from the inlet and outlet of vessel 202 to permit reactor 201 to be coupled to the treatment system and used in the manner discussed above for removing contaminants from a flow of wastewater. The relative equal distance between anode electrodes 223 minimizes uneven dissolution of the anode electrodes. The conical bottom wall portion 207 of vessel 202 avoids hang-ups of floc, sand or other particulate matter at the outlet of the vessel and thus facilitates continuous flow from chamber 206 of the vessel.

Although the present invention has been described in the context of the certain preferred embodiments, it should be recognized that the invention has broad applicability. Accordingly, it is not intended that the scope of the inventions be limited to the particularly disclosed embodiments. Rather, the scope of the invention should be determined by reference to the following claims.

What is claimed is:

1. A method for removing contaminants from a flow of wastewater using a purification apparatus which includes conduit means and an electrolytic oxidation vessel provided with a chamber and inlet and outlet fittings in communication with the chamber, the inlet and outlet fittings being coupled to the conduit means, the vessel having at least one elongate cathodic electrode and a plurality of elongate sacrificial anodic electrodes aligned in parallel with the cathodic electrode in the chamber, comprising the steps of directing the flow of wastewater through the conduit means and through the chamber of the electrolytic oxidation vessel in a direction parallel with the cathodic and anodic electrodes so that the flow of wastewater engages the cathodic and anodic electrodes, applying a voltage across the cathodic electrode and the sacrificial anodic electrodes to create a current having a density ranging from approximately 5–50 ma/sq. cm. so as to release ions from the anodic electrodes which oxidize and render insoluble contaminants in the flow of wastewater and create insoluble contaminants and substantially cleansed water, separating the insoluble contaminants from the substantially cleansed water, disconnecting the inlet and outlet fittings of the vessel from the conduit means, selecting another vessel similar to said first named vessel and having inlet and outlet fittings which were hermetically sealed prior to use so as to inhibit corrosion of the anodic electrodes, unsealing the inlet and outlet fittings of said another vessel, coupling the inlet and outlet fittings of said another vessel to the conduit means and repeating said directing, applying and separating steps.

2. The method of claim 1 wherein the applying step includes permitting a floc containing insoluble contaminants to form in the chamber of the electrolytic oxidation vessel.

3. The method of claim 2 wherein the separating step includes coalescing the floc into a sludge.

4. The method of claim 3 wherein the separating step includes directing the sludge through a filter to generate a sludge cake.

5. The method of claim 4 wherein the directing step includes directing the sludge through a filter selected from the group consisting of rotary vacuum filters and plate and frame filters.

6. The method of claim 4 wherein the separating step includes combining the sludge cake with a cementaceous material to form a non-leachable solid.

7. The method of claim 3 wherein the separating step includes directing the sludge through a clarifier to generate a sludge cake.

8. The method of claim 2 wherein the permitting step includes adding a chemical flocculating agent to the insoluble contaminants and substantially cleansed water.

9. The method of claim 2 wherein the permitting step includes adding ferrous sulfate to the insoluble contaminants and substantially cleansed water.

10. The method of claim 2 wherein the permitting step includes providing calcium hydroxide to the insoluble contaminants and substantially cleansed water.

11. The method of claim 10 wherein the applying step includes injecting sodium hydroxide and calcium chloride into the flow of wastewater.

12. The method of claim 1 wherein the contaminants in the flow of wastewater include hydrocarbons, oil, grease and volatile organic compounds and wherein the applying step includes creating partially oxidized hydrocarbons, oil and grease and oxidized volatile organic compounds from the flow of wastewater.

13. The method of claim 1 wherein the contaminants in the flow of wastewater include volatile organic compounds, the method further comprising the step of pretreating the wastewater in a gas stripper to volatilize at least some volatile organic compounds and create a VOC containing gas stream and a stripped flow of wastewater and oxidizing the VOC containing gas stream in an oxidation reactor, the stripped flow of wastewater being directed to the chamber of the electrolytic oxidation vessel.

14. The method of claim 1 wherein the contaminants in the flow of wastewater include volatile organic compounds, the method further comprising the step of destroying the volatile organic compounds by an oxidation process selected from the group consisting of photolytic oxidation and catalytic oxidation.

15. The method of claim 1 for use with an additional electrolytic oxidation vessel similar to the first named electrolytic oxidation vessel wherein the directing step includes directing a portion of the flow of wastewater into the chamber of the additional electrolytic oxidation vessel and wherein the applying step includes alternately directing voltage between the first named electrolytic oxidation vessel and the additional electrolytic oxidation vessel.

16. The method of claim 1 further comprising the step of adding a polymeric flocculent to the insoluble contaminants and substantially cleansed water.

17. The method of claim 1 wherein the flow of wastewater includes at least 10 ppm lead and wherein the applying step includes creating substantially cleansed water containing no more than 500 ppb lead.

18. The method of claim 1 wherein the flow of wastewater includes at least 1 ppm cadmium and wherein the applying step includes creating substantially cleansed water containing no more than 100 ppb cadmium.

19. The method of claim 1 wherein the flow of wastewater includes at least 1000 ppm oil and grease and wherein the applying step includes creating substantially cleansed water containing no more than 100 ppm oil and grease.

20. The method of claim 1 wherein the flow of wastewater is generated in an industrial process, the method further comprising the step of directing the substantially cleansed water into the industrial process.

21. The method of claim 1 wherein the directing step includes diluting the flow of wastewater with substantially cleansed water.

22. A modular electrolytic oxidation reactor for use in a treatment system which removes contaminants from a flow of wastewater comprising a vessel having an internal chamber and inlet and outlet fittings in communication with the chamber adapted to permit the flow of wastewater to enter and exit the chamber, an electrode assembly carried by the vessel within the chamber including at least one elongate cathodic electrode and a plurality of elongate sacrificial anodic electrodes, connector means carried by the vessel and electrically coupled to the cathodic electrode and the sacrificial anodic electrodes of the electrode assembly for permitting a voltage to be applied across the cathodic electrode and the sacrificial anodic electrodes and first and second removable seal means mounted respectively on the inlet and outlet fittings for hermetically sealing the inlet and outlet fittings prior to installation in the treatment system so as to inhibit corrosion of the sacrificial anodic electrodes prior to installation of the modular reactor whereby the first and second seal means can be removed to permit the modular reactor to be coupled to the treatment system and whereby the modular reactor facilitates replacement of the sacrificial anodic electrodes.

23. A reactor as in claim 22 wherein the plurality of elongate sacrificial anodic electrodes include a plurality of anodic electrodes made from iron and a plurality of anodic electrodes made from magnesium.

24. A reactor as in claim 23 wherein the ratio of iron anodic electrodes to magnesium anodic electrodes is approximately 6:3.

25. A reactor as in claim 22 wherein the plurality of elongate sacrificial anodic electrodes include a plurality of anodic electrodes made from iron and a plurality of anodic electrodes made from aluminum.

26. A reactor as in claim 25 wherein the ratio of iron anodic electrodes to aluminum anodic electrodes is approximately 5:4.

27. A reactor as in claim 22 wherein the plurality of elongate sacrificial anodic electrodes include a plurality of anodic electrodes made from iron, a plurality of anodic electrodes made from magnesium and a plurality of anodic electrodes made from aluminum.

28. A modular electrolytic oxidation reactor for use in a treatment system which removes contaminants from a flow of wastewater comprising a vessel having an internal chamber and inlet and outlet fittings in communication with the chamber adapted to permit the flow of wastewater to enter and exit the chamber, an electrode assembly carried by the vessel within the chamber including at least one elongate cathodic electrode and a plurality of elongate sacrificial anodic electrodes, connector means carried by the vessel and electrically coupled to the cathodic electrode and the sacrificial anodic electrodes of the electrode assembly for permitting a voltage to be applied across the cathodic electrode and the sacrificial anodic electrodes and first and second removable seal means mounted respectively on the inlet and outlet fittings for hermetically sealing the inlet and outlet fittings prior to installation of the modular reactor in the treatment system so as to inhibit corrosion of the sacrificial anodic electrodes prior to installation whereby the first and second seal means can be removed to permit the modular reactor to be coupled to the treatment system and whereby the modular reactor facilitates replacement of the sacrificial anodic electrodes.

29. A reactor as in claim 28 wherein the vessel further includes a cap joined to the upper extremity of the side wall, the electrode assembly being carried by the cap.

30. A reactor as in claim 22 wherein the cathodic electrode extends along an axis and the sacrificial anodic electrodes extends in directions parallel to the axis.

31. A reactor as in claim 22 together with an inert gas disposed within the vessel for minimizing corrosion to the sacrificial anodic electrodes.

* * * * *